(No Model.)
S. MOORE.
LATHE FOR TURNING SPIRALS.
No. 319,922. Patented June 9, 1885.
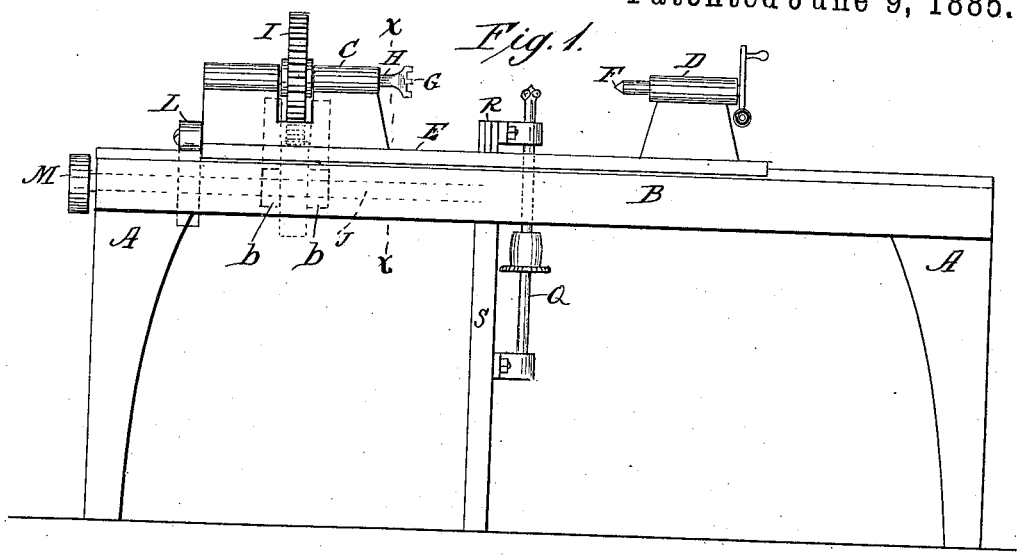
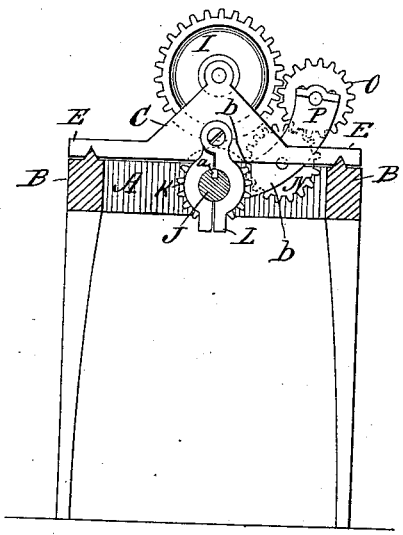
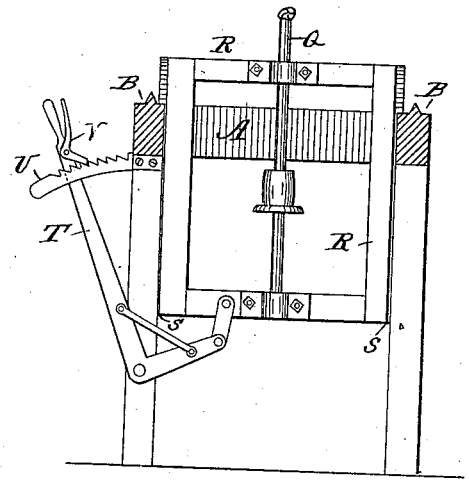
WITNESSES:
W. W. Hollingsworth
W. X. Stevens.
INVENTOR:
Silas Moore
BY Munn & Co
ATTORNEYS.

UNITED STATES PATENT OFFICE.

SILAS MOORE, OF CLEVELAND, OHIO.

LATHE FOR TURNING SPIRALS.

SPECIFICATION forming part of Letters Patent No. 319,922, dated June 9, 1885.

Application filed October 13, 1884. (No model.)

*To all whom it may concern:*

Be it known that I, SILAS MOORE, a citizen of the United States, residing at Cleveland, in the county of Cuyahoga and State of Ohio, have invented certain new and useful Improvements in Spiral-Lathes, of which the following is a description.

This invention relates to that class of lathes which are used for turning work into spiral form; and its object is to feed the work regularly against a revolving cutter, to withdraw the cutter, and to quickly return the work to repeat the operation.

To this end my invention consists in the construction and combination of parts forming a lathe for shaping work in spiral form, hereinafter described and claimed, reference being had to the accompanying drawings, in which—

Figure 1 is a front elevation of my lathe, and Fig. 2 is a transverse vertical section thereof at $xx$ of Fig. 1. Fig. 3 is a transverse vertical section at $xx$, Fig. 1, facing in the opposite direction to Fig. 2.

A represents the frame of the lathe, having the usual ways or shears, B.

C is the head-stock, and D the tail-stock, both fitted to slide longitudinally upon the ways B and connected together by longitudinal bars E, which may be rigidly fixed thereto; or they may be made adjustable, so that the head and tail stocks may be fixed at distances apart to suit the length of the work. The work is held to be turned between the dead-center F and the line-center G. The center G is fixed in a spindle, H, which is journaled in the head-stock C and provided with a gear-wheel, I.

J is the feed-screw, journaled in bearings in the frame of the machine and longitudinally slotted to receive a spline, $a$, of a gear-wheel, K, which is free to slide longitudinally upon the screw, but which is at the same time confined between bearings $b$, so as to be carried along thereby.

L is an open-and-shut screw-nut adapted to engage the thread of the screw J, or to be disengaged therefrom by the operator. This nut is hung to the head-stock C, and when engaged with the screw it feeds the carriage forward; but when disengaged it leaves the head-stock free to be drawn quickly back by hand. The screw is provided with any usual driving mechanism—such as the belt-pulley M—by which it is given a continuous rotary motion in one direction. The screw imparts rotary motion to the work through the head-stock spindle by means of the intermediate gear-wheels, N and O, which communicate between the gear-wheels K and I.

The wheels N and O are journaled in a frame, P, which is pivoted to be swung to and from the wheel I, so that larger or smaller wheels may be engaged, and so that the wheel O may be dispensed with in case it is desired to cut a left instead of a right hand spiral.

Q is the cutter-shaft, journaled in a sash, R, which is fitted to slide vertically in ways S, and is provided with a hand-lever, T, by which it may be raised or lowered to carry the cutting-tool toward or away from the center of the work, either while work is in progress or at rest.

U is a notched segment, and V a spring-latch on the lever to engage the segment to hold the cutter fixed at any desired height. Thus with my machine spirals may be cut either right or left handed, cylindrical, tapering, or in any waving pattern required, and the pitch of the spiral may be regulated at the beginning of each job of work by arranging the gear-wheels in proper relation to the screw.

What I claim as my invention, and desire to secure by Letters Patent, is—

1. In a spiral-lathe, the combination, with a head-stock and tail-stock fitted to slide upon the latheways, and means, substantially as described, binding the head and tail stocks to each other to move as one, of a spindle journaled in the head-stock, a gear-wheel on the spindle, a longitudinally-slotted screw journaled in the frame of the lathe and means for revolving it, a gear-wheel fitted to slide upon the screw and provided with a spline engaging the slot in the screw, the last-named gear-wheel being fitted at its sides to bear in the head-stock, intermediate gear-wheels connecting the gear-wheel on the screw with the gear-wheel on the spindle, and a nut engaging the head-stock with the screw, substantially as shown and described.

2. In a spiral-lathe, the combination, with a head-stock and tail-stock fitted to slide as one piece on the latheways, of a cutter-spindle journaled in a sash fitted to slide to and from the line of the lathe-centers, a hand-lever pivoted to the lathe-frame, a link connecting it with the said sash, a segment of teeth, U, secured upon the lathe, and a spring-latch, V, pivoted to the lever to engage the said teeth, substantially as shown and described.

SILAS MOORE.

Witnesses:
C. W. COATES,
W. C. COATES,
T. D. BROWN.